No. 623,064. Patented Apr. 11, 1899.
D. O. & J. H. BAER & G. W. DUNBAR.
APPARATUS FOR SETTING FENCE POSTS.
(Application filed Apr. 28, 1898.)
(No Model.)

Witnesses:
Wm C Thompson
P. E. Doll

Inventors:
David O. Baer.
John H. Baer.
George W. Dunbar.
By E. T. Silvius, Attorney

United States Patent Office.

DAVID O. BAER, JOHN H. BAER, AND GEORGE W. DUNBAR, OF CLARK'S HILL, INDIANA.

APPARATUS FOR SETTING FENCE-POSTS.

SPECIFICATION forming part of Letters Patent No. 623,064, dated April 11, 1899.

Application filed April 28, 1898. Serial No. 679,066. (No model.)

*To all whom it may concern:*

Be it known that we, DAVID O. BAER, JOHN H. BAER, and GEORGE W. DUNBAR, citizens of the United States, residing at Clark's Hill, in the county of Tippecanoe and State of Indiana, have invented certain new and useful Improvements in Apparatus for Setting Fence-Posts; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to a portable device that is designed to be used in setting or placing in position the wooden posts for fences of the class usually adopted in farming districts; and it consists in an apparatus or machine mounted upon adjustable runners, whereon it may be drawn by means of horse-power and quickly adjusted to unevenness of ground and adapted to support a post in a perpendicular position and drive it into the earth operated manually; and it consists, further, in the parts and combination and arrangement of parts embodied in the construction of said apparatus, as will be fully described hereinafter and claimed.

Figure 1:
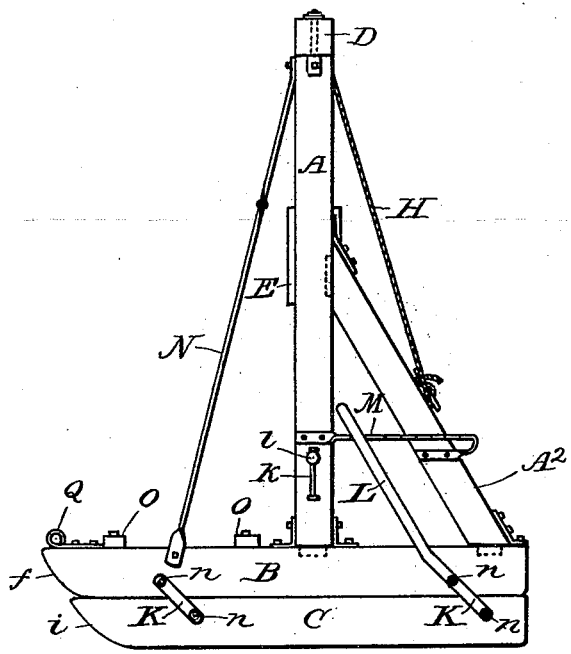
Figure 2:
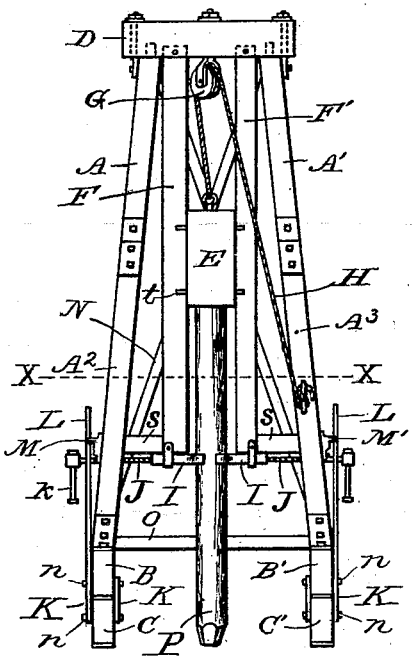
Figure 3:
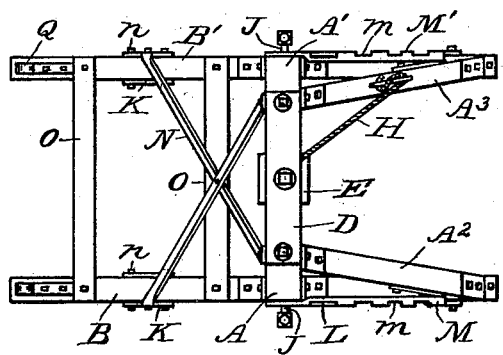
Figure 4:
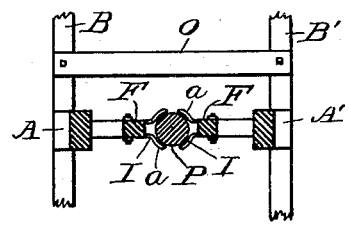
Figure 5:
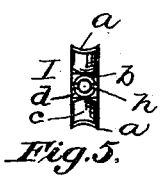
Figure 6:
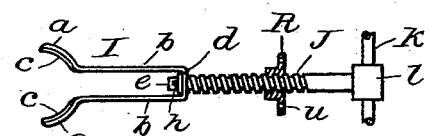
Figure 7:

Referring to the drawings, Figure 1 represents a side elevation; Fig. 2, a rear elevation; Fig. 3, a top plan view; Fig. 4, a fragmentary horizontal sectional view taken on the line $x\ x$ in Fig. 2; and Figs. 5, 6, and 7, details of the post-adjusting devices.

In the drawings similar letters of reference in the several views designate corresponding parts.

In carrying out our invention we provide an apparatus which may be constructed of material and parts throughout that may be readily obtained in the market or easily provided by local shops or mills without requiring special machinery or tools in their production. Hence it may be constructed very cheaply in almost any local shop near the locality in which it is intended to be used, thus avoiding transportation and other expenses which would detract from the economic value of devices of this character.

The details of construction comprise as a main frame the upright pieces A A', preferably converging at their upper ends, to which is suitably secured a cap-piece D, and having their lower ends secured upon the top of counterpart runners B B', angle-braces $A^2 A^3$, of wood, suitably secured, and crossed angular braces N, of iron, preferably of the flat or hoop-iron form. Vertical parallel guides F F' are attached at their upper ends to the cap-piece D and at their lower ends to the pieces A A' by suitable intermediate brace-pieces S S. The various parts are preferably bolted together, so as to be detachable when it is desired to stow away in the winter season. The forward ends of the runners B B' have sloping soles $f$, and the top of each runner is preferably provided with draft-irons Q, by which the apparatus is drawn. Tie-pieces O O are secured to the runners forward of the upright pieces A A', and a suitable cross-piece may also be applied, if desired, to connect the angle-pieces $A^2 A^3$ sufficiently high to clear a post after being set.

The hammer E is of the usual type and may be made either of iron or wood and adapted to work between the guides F F'. It may be suitably made of heavy tough wood, to which are spiked suitable guide-pieces, or auger-holes may be bored, into which are driven iron bars to form guide-pins $t$. A rope H is attached to the top of the hammer and runs over a suitably-mounted pulley G, supported by the cap D, and by means of the rope the hammer is manually operated in the usual manner to drive the post P into the earth a suitable distance, as in driving well-pipe, &c. The guides F F' are spread sufficiently so that they will not interfere with the post should they not be entirely perpendicular.

In order to provide means whereby the guides F F' may be quickly set to an approximately perpendicular line upon uneven ground or when a ditch runs near to and parallel with the fence-line, we provide supplemental runners C C', one or both of which may be quickly detached when not required, and they are connected to the main runners B B', respectively, by means of parallel iron links K and pivot-bolts $n$ and have sloping forward ends $i$. Each outside rearward link K extends upward a suitable distance, forming a lever L, engaging notches $m$ in the side of a latch-bar M, which is suitably anchored to the frame-pieces, the lever being sprung out of the notches when operating it. By drawing either lever backward the main runner B or B' and the corresponding side of the main frame are drawn backward and also are elevated, and the further various adjustments will be obvious.

As it would be impracticable to economically exactly adjust any device for this purpose so as to be level or perpendicular, a more simple and ready means must be resorted to by which the post may be driven so as to be sufficiently perpendicular for practical purposes; and to this end we provide post-adjusting devices which are operated independently of the main apparatus, and they comprise counterpart yokes I, mounted horizontally in suitable guide-brackets supported below the guides F F', so that they slide endwise in opposite directions toward one another, as well as to the interposed post P, which is embraced by the forks of the yokes. The yokes may be adapted to be operated by means of suitable latching-levers; but we preferably employ screws, as and for the reasons hereinafter described.

Each yoke I is preferably composed of a flat or rectangular iron bar bent centrally so as to form a tail end $d$ and parallel body-pieces $b\ b$, terminating in semicircular ends $a\ a$, having convex inner faces $c\ c$ and together forming a forked head. The end $d$ has a hole drilled therein to admit the end $e$ of the screw J. This screw is preferably employed because it is of the type commonly kept in stock in nearly every hardware-store, being employed in vises for carpenters' benches, and it may be readily adapted for the purposes of our invention. The head $l$ and lever $k$ may be retained in use, or they may be removed and a hand-wheel substituted, if desired. The end $e$ is reduced, so as to form a cylindrical tip or spindle and a shoulder to bear against the outer side of the end $d$, at the inside of which is a pin $h$, driven through a suitable hole and bearing against a suitable washer. A flanged nut R, having a threaded hole T, is fitted to the threads of the screw, and by means of bolts in holes $u$ the nut is secured to the upright pieces A A'. Thus after a post is set each screw is manipulated to guide the post in either direction, as may be desired.

Having thus described our invention, what we claim as new, and desire to secure by Letters Patent, is—

In an apparatus for setting fence-posts, the combination of the main runners and the main frame secured thereon, the supplemental runners beneath said main runners and secured thereto by means of the pivoted links, the levers whereby said main runners may be raised and adjusted upon said supplemental runners, the vertical guides and the drop-hammer working therein, the operating-rope connected to said hammer and running over a pulley supported at the top of said main frame, and the post-adjusting yokes and controlling devices, substantially as shown and described.

In testimony whereof we affix our signatures in presence of two witnesses.

DAVID O. BAER.
JOHN H. BAER.
GEORGE W. DUNBAR.

Witnesses:
JEFFERSON J. YOUNG,
HENRY G. PARRISH.